Aug. 6, 1929.  V. P. ROE  1,723,711
CONCENTRATOR
Filed Oct. 22, 1927  4 Sheets-Sheet 1
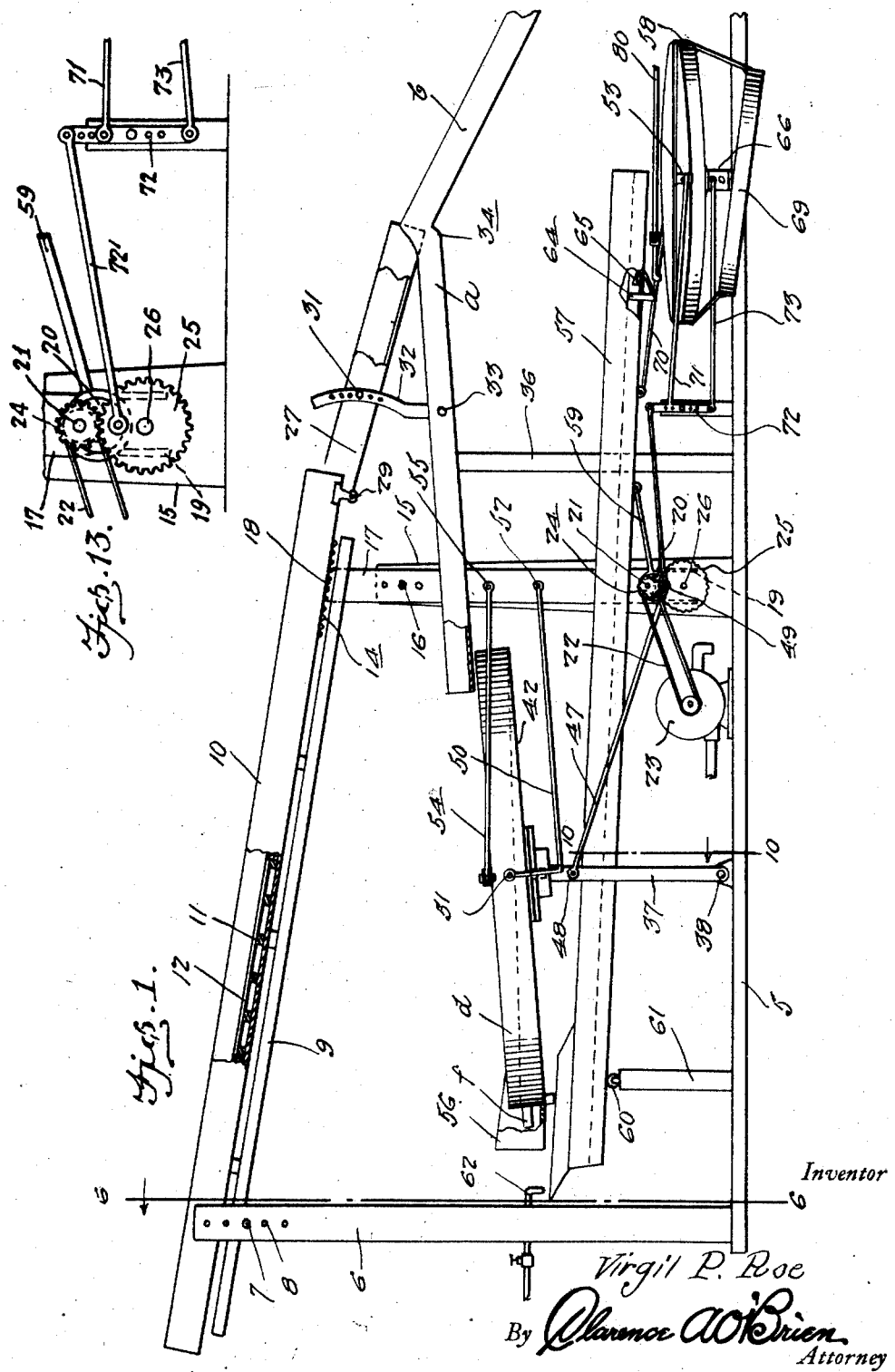
Inventor
Virgil P. Roe
By Clarence A. O'Brien
Attorney

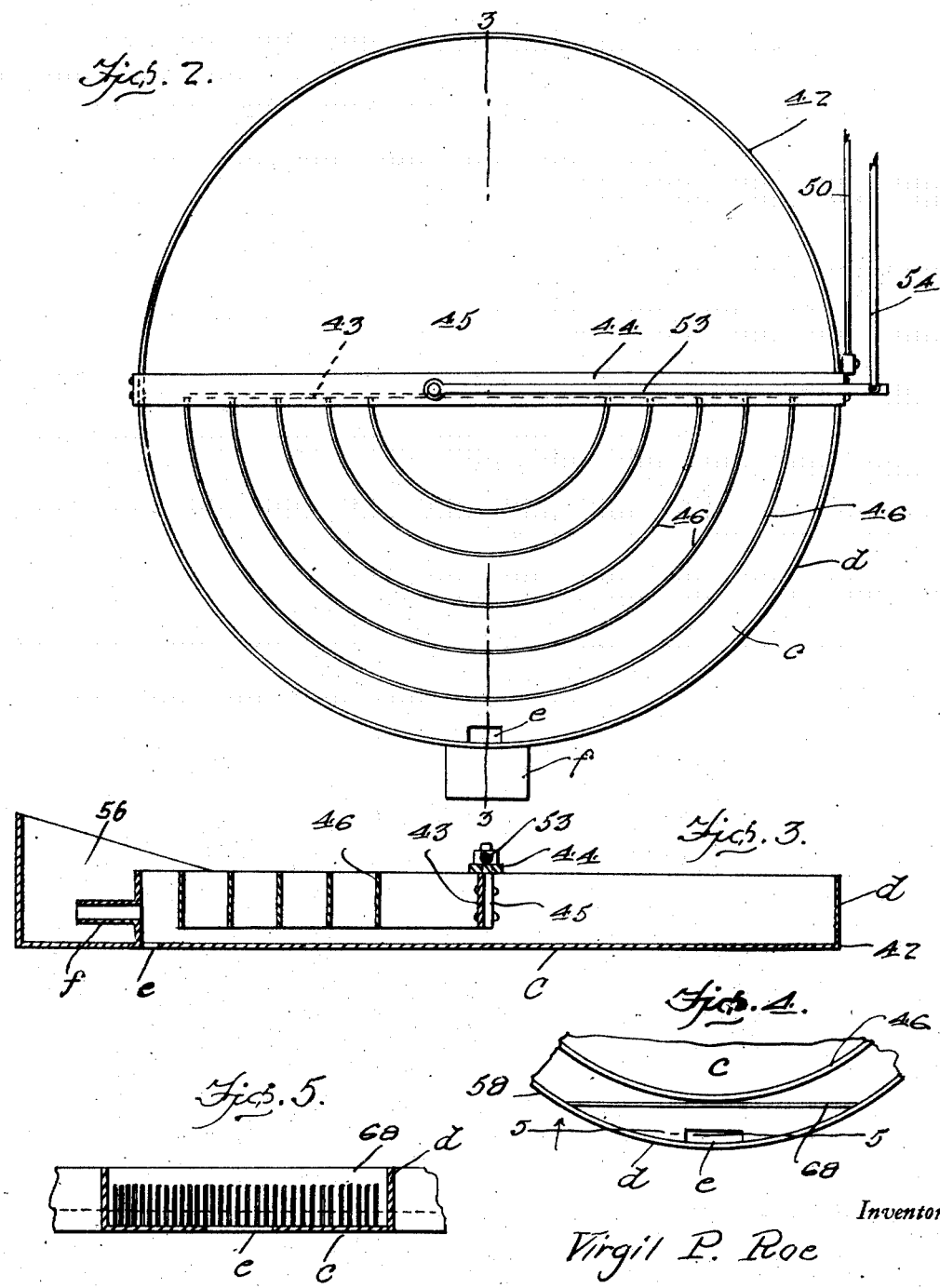

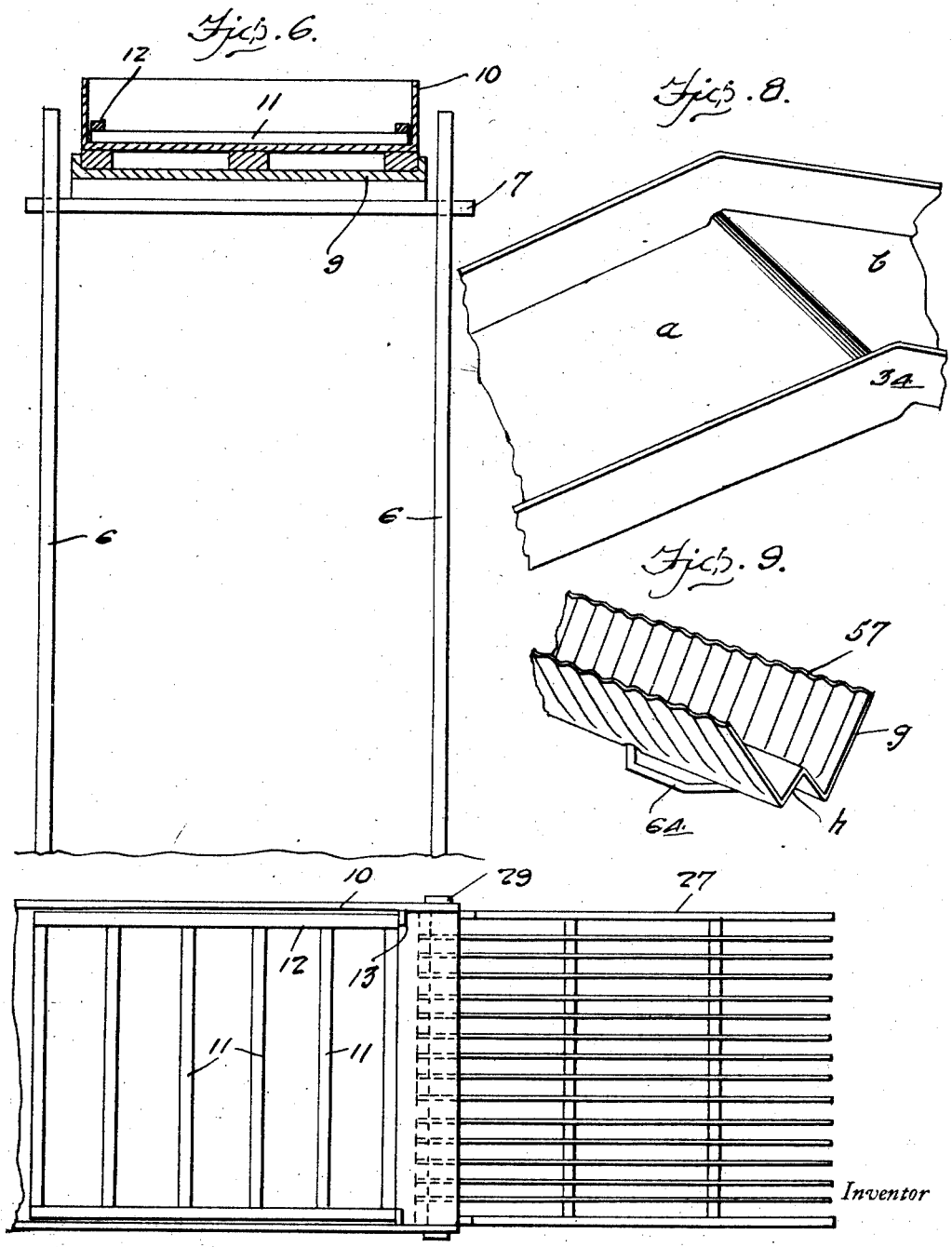

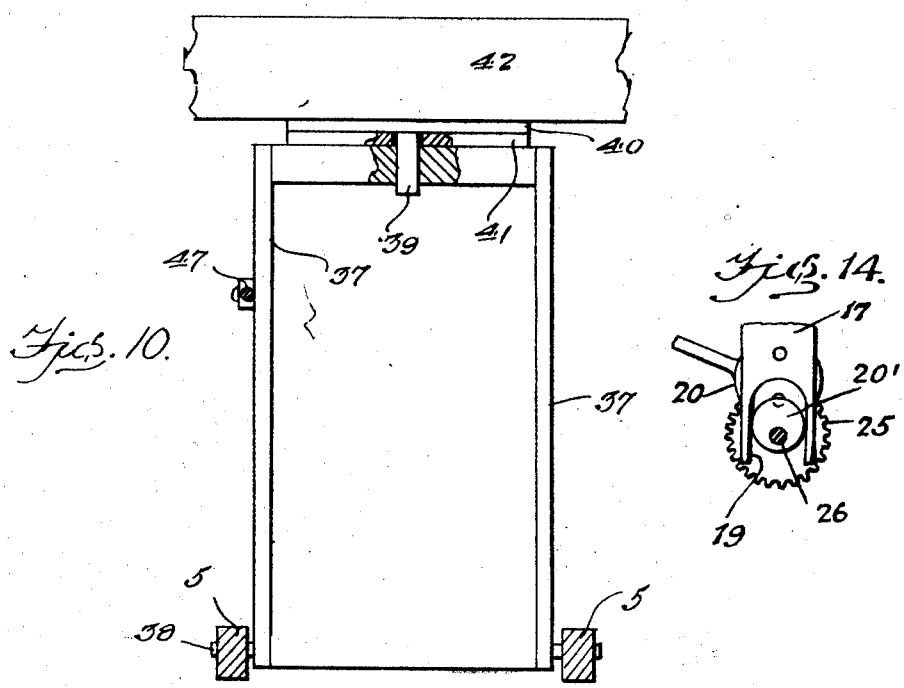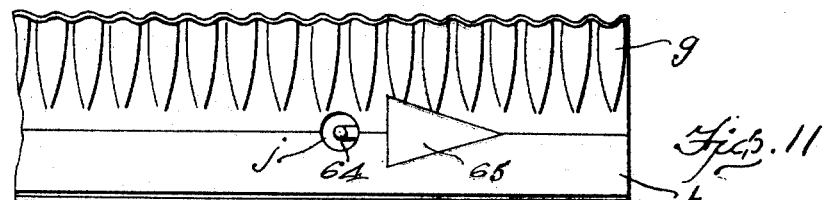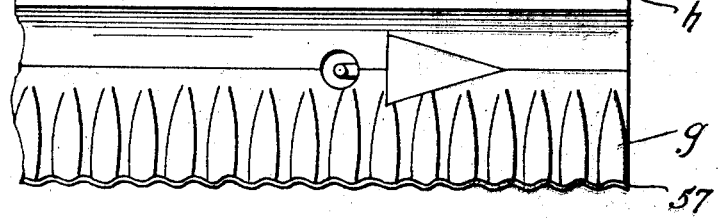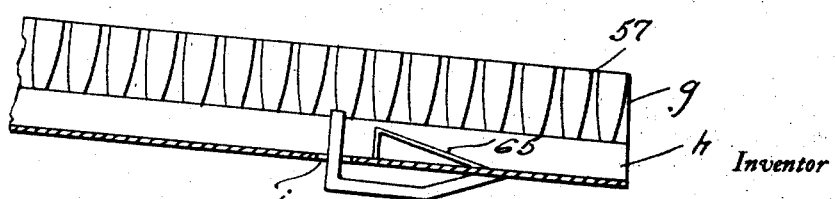

Patented Aug. 6, 1929.

1,723,711

UNITED STATES PATENT OFFICE.

VIRGIL P. ROE, OF CLARKSTON, WASHINGTON.

CONCENTRATOR.

Application filed October 22, 1927. Serial No. 227,993.

The present invention relates to a concentrator and has for its prime object to provide a concentrating apparatus which is particularly adapted for separating gold from sand, gravel, rock, and other foreign matter.

Another very important object of the invention resides in the provision of an apparatus of this nature which is simple in its construction, compact and convenient in its arrangement of parts, thoroughly efficient and reliable in its operation, and otherwise well adapted for the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a side elevation of the apparatus embodying the features of my invention and showing portions broken away and in section, Figure 2 is a top plan view of the main concentrator pan.

Figure 3 is a sectional view therethrough taken substantially on the line 3—3 of Figure 2, Figure 4 is a fragmentary top plan view showing a portion of the second concentrator pan, Figure 5 is an enlarged detail section taken substantially on the line 5—5 of Figure 4, Figure 6 is a section taken substantially on the line 6—6 of Figure 1, Figure 7 is a fragmentary top plan view showing the sluice box and screen, Figure 8 is a fragmentary detail perspective showing a portion of the trough which is disposed under the same, Figure 9 is a perspective view of the shaker trough showing one end only, Figure 10 is an enlarged detail section taken substantially on the line 10—10 of Figure 1, Figure 11 is a top plan view of the lower end of the shaker trough, Figure 12 is a longitudinal vertical section therethrough, Figure 13 is an enlarged detail view of the gearing, and Figure 14 is an enlarged detail view of the lower end of the rocker.

Referring to the drawings in detail, it will be seen that the numeral 5 denotes the base comprising two spaced parallel beams or of any other suitable formation. A pair of standards 6 rise from one end of the base 5 and a rod 7 extends through openings 8 thereof so that the rod may be adjusted to different desired heights. A frame 9 is attached to an elongated open-ended sluice box 10 on the bottom of which are mounted transverse ripple slats 11 connected together in groups by tie rods 12. These groups of ripple slats are held in the sluice box 10 against longitudinal movement therein by means of lugs 13. This sluice box inclines downwardly from the rod 7 and the lower end thereof is formed with a rack 14. A standard 15 rising from the base 5 has pivoted to its upper end as at 16 a rocker 17 the upper end of which is formed with a gear segment 18 meshing with the rack 14. The lower end of the rocker 17 is bifurcated as at 19 to form a slot in which operates a cam 20′ on a shaft 26 operatively connected by means of gears 24 and 25 and a belt 22 with a prime mover such as a water motor 23.

A pinion 24 is mounted on the shaft 1 and meshes with a gear 25 on a shaft 26. A screen 27 is pivotally engaged as at 28 with the lower end of the sluice box 10 and inclines downwardly therefrom being rockably mounted in an adjustable manner as at 31 to standards 32 which are rockably mounted as at 33 to section $a$ of a trough 34. The section $a$ inclines in an opposite direction to the screen 27. The other section $b$ of the trough 34 inclines in the same direction with the screen 27. The screen terminates at the juncture of the two sections $a$ and $b$. This trough 34 may be supported by suitable standards 36 or in any other preferred manner.

A frame 37 is rockably mounted at its lower end on the base 5 as at 38 and is of an inverted U-shaped formation. In the center of the top portion of the frame 37 there is journaled a pin 39 depending from a disc 40 which rests on a disc 41 fixedly mounted on top of the frame 37. A pan 42 is mounted concentrically on the disc 40. This pan is of a circular construction and comprises a bottom $c$ and a rim $d$. A diametrically extending cross member 43 is mounted in the rim $d$ but is not connected thereto in any way. A cross support 44 is fixed to the upper edge of the rim $d$ to extend diametrically thereacross and a stub shaft 45 is journalled therethrough a distance from the center of the pan 42. A plurality of arcuate concentric blades 46 have their ends attached to the cross member 43. The bottom $c$ is provided with an opening $e$ adjacent the rim $d$ and the rim $d$ has an outlet nipple $f$ extending outwardly therefrom. A connecting rod 47 is pivotally engaged as at 48 with the upper portion of the frame 37 and eccentrically engaged as at 49 with the gear 25. A connecting rod 50 is pivotally engaged as at 51 with the rim $d$ of the pan 42 and pivotally engaged as at 52 with the rocker 17. An arm 53 is fixed to the stubshaft 45 and extends beyond the side of the pan as is clearly illustrated in Figure 2 to terminate beyond the rim thereof and a connecting rod 54 is engaged with the outer end of the arm 53 and pivotally engaged as at 55 with the rocker 17 above the pivot 52 so that the throw of the connecting rod 54 is not as great as that of the connecting rod 50.

When the prime mover 23 is in operation it will be seen that the frame 37 rocks and the pan 42 moves therewith and at the same time the pan is oscillated by the rod 50 and the blades are oscillated by the rod 54. The lower end of the trough section $a$ terminates above the upper portion of the pan 42 which is normally inclined in the same direction with the cross section $a$ as is clearly illustrated in Figure 1. A shield 56 is mounted on the rim $d$ of the pan 42 about the outlet nipple $f$.

An elongated shaker trough 57 extends from the outlet $e$ of the pan 42 to above a pan 58. This trough 47 is connected by a rod 59 with an eccentric cam 20 on the shaft 21 and reciprocates on a roller 60 mounted on a supporting structure 61. Water is led to the upper end of the trough by a conduit 62. The structure of this trough is illustrated to advantage in Figs. 9, 11 and 12 wherein it will be seen that the side walls of the trough are corrugated as at $g$ while the bottom is of an inverted V-shaped formation in cross section as at $h$. In the troughs formed between the bottom $h$ and the side walls $g$ at the lower end of the shaker trough there are formed outlet openings $j$ to lead the material into the pan 58. A rod 64 extends up into each of the openings $j$ to prevent clogging of these openings and stops 65 are located adjacent the openings.

The pan 58 is identical in construction with the pan 42 except for size and is mounted on a rockable frame 66. In addition to the analogous structure of this pan 58 to the pan 42 there are also provided as is shown in Figure 4, a plurality of comb teeth 68 rising from the bottom between the outlet and the blades 46 therein. Suspended from the pan 58 to move therewith is a pan 69. A connecting rod 70 is engaged with the shaker trough 57 and with the pan 58. A connecting rod 71 is connected with the arm 53 of the pan 58 and with a rocker 72 connected with the gear 25 by rod 72′. A rod 73 is engaged with the rocker 72 and with the rocker frame 66.

This concentrator is to be worked in connection with an ordinary sluice box, the gravel going over the sluice box enters into the sluice box 10 of my apparatus. The slope and movement of this sluice box 10 causes all the fine gold to break loose from rocks to which it may be held by mud or clay and the fine gold settles behind the ripple slats 11. Gold such as flour and flake will not settle in this way so that it will pass over the lower end of the sluice box onto the screen 27 and will be separated from the gravel and rock by the screen, the gravel and rock passing out through the section $b$ while the gold, sand and fine gravel flow down the section $a$ of the trough 34. The mixture from the section $a$ enters the pan 42 which pan turns and quivers while the blades move therein as explained thereby settling the flake and flour gold to the bottom while the blades keep the sand loose. The blades cause a small gap to be formed in the sand which allows water to seep in making the sand soft and easy so that the gold may settle to the bottom of the pan. At the lower end of the pan are the outlet $c$ and the outlet $f$. The outlet $f$ maintains the valuable sand in the pan so that it may flow downwardly through the outlet $e$ into the trough 57 and move along this inclined trough to the lower end thereof by the movement which is imparted thereto as heretofore explained. This sand reaches the pan 58. The heavy corrugations in the side walls of the trough 57 cause the settling of the fine gold to its bottom and the fine gold will be thrown up in the sand and the corrugations hold the sand away from the side wall as it is being quivered and this allows water to get in around the sand which makes it soft and allows all the fine gold to settle to the bottom while the sand runs forward or downwardly. Water enters the tray or trough 57 from the conduit 62 at the upper end.

When the sand reaches the end of the tray or trough 57 it is mostly black sand and what fine gold there is goes through the outlets $j$. This sand going through the outlets $j$ enters into the pan 58 which operates thereon in the same manner as the pan 42 operates on material entering it. Between the outermost blade and the flange of this pan there is provided a plurality of cone teeth to cause the sand to pack around the side walls, making a lodging place for the fine gold when quicksilver is not used. When the sand enters the pan 69 it receives its final treatment.

It is thought that the construction, operation, utility, and advantages of this invention will now be quite apparent to those skilled in this art without a more detailed description thereof. The present embodiment of the invention has been disclosed in detail merely by way of example since in actual practice it attains the features of advantage enumerated as desirable in the statement of the invention and the above description.

It will be apparent that changes in the details of construction, and in the combination and arrangement of parts may be resorted to without departing from the spirit and scope of the invention as hereinafter claimed or sacrificing any of its advantages.

Having thus described my invention, what I claim as new is:—

In a concentrator, and in combination, a concentrating pan, a rockably mounted frame, a pin extending downwardly from the center of the pan and rotatable in the top of the frame, means for rocking the rocker and means for oscillating the pan, a plurality of concentric arcuate blades in the pan, a connector on the ends of the blades, a cross member on the pan, and a stub shaft from the connector journaled in the cross member off-center of the pan, and means for oscillating the stub shaft, the bottom of the pan at one end being provided with an opening, and the rim of the pan above the pan being provided with an outwardly extending outlet nipple.

In testimony whereof I affix my signature.

VIRGIL P. ROE.